Aug. 16, 1960  K. GEBELE  2,949,074
PHOTOGRAPHIC CAMERA WITH OBJECTIVE LENS
Filed July 19, 1956
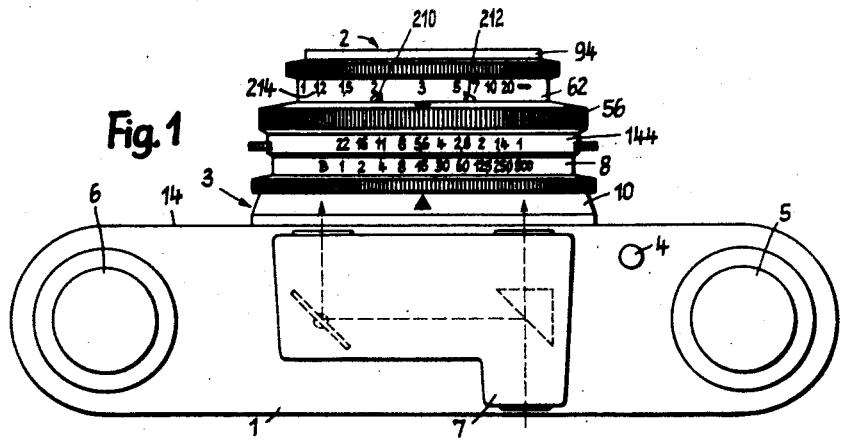
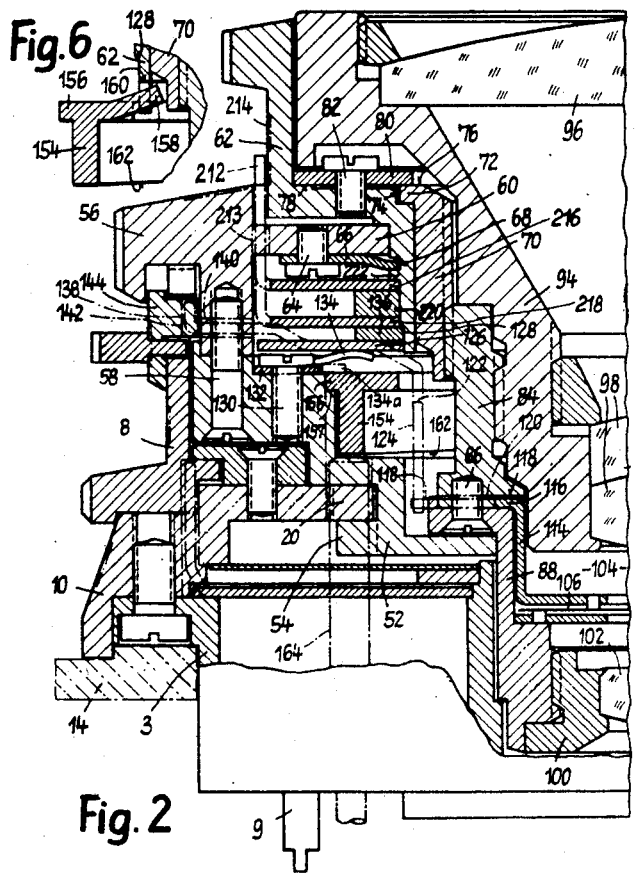
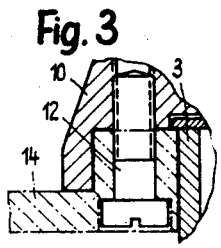
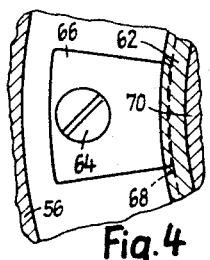
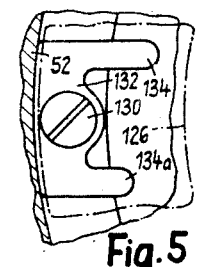

United States Patent Office 2,949,074
Patented Aug. 16, 1960

2,949,074

PHOTOGRAPHIC CAMERA WITH OBJECTIVE LENS

Kurt Gebele, Munich, Germany, assignor, by mesne assignments, to Compur-Werk Friedrich Deckel OHG, Munich, Germany, a firm of Germany Filed July 19, 1956, Ser. No. 598,943

Claims priority, application Germany July 22, 1955

4 Claims. (Cl. 95—44)

The present invention relates to a photographic camera. For the purpose of obtaining a correct focussing of a camera customarily the objective lens or at least a part thereof is mounted on the camera in the manner to permit axial displacement. This axial displacement is generally obtained by use of helical gears which effect axial displacement of the objective lens as a whole or of a part thereof by rotating a member of the lens mount. If the camera provides a coupled range-finder, this rotatable lens mount furthermore provides a cam member associated with the rotatable setting means for communicating the focussing movement from the lens mount to the range-finder.

It is obvious that in order to obtain correct and exact focussing this entire arrangement must be free of backlash but must on the other hand permit easy operation. With respect to these requirements the production tolerances and clearances require a very high precision and accuracy of manufacture.

The present invention has the object of providing a camera with focussing means and lens mount which attain high accuracy and ease of operation without high or excessive requirements of accuracy of manufacture.

It is a further object of the present invention to provide a camera which is cheap in manufacture and easy in operation, but complies with all requirements as regards accuracy of focussing and optical alignment.

More particularly this object is obtained by providing a photographic camera with an objective lens, at least parts of which may be displaced axially for the purpose of focussing by employment of rotatable parts of the lens mount, where resilient means are provided between the stationary and rotatable parts of the lens mount which urge against each other the rotatable parts and the stationary parts, whereby any backlash between these parts is eliminated.

A further object of the present invention is to provide a camera with coupled range-finder, where the control cam for the range-finder is supported separately of the rotatable part of the lens mount, but is coupled to the same by coupling means which effect a rigid coupling with respect to rotation but free relative movement in all other respects.

The present invention will now be explained with the aid of the embodiments shown by the attached drawings, where Fig. 1 shows the camera according to the present invention.

Fig. 2 represents a section through the lens mount of this camera and

Figs. 3, 4, 5 and 6 show details of the embodiment of Fig. 2.

Fig. 1 represents a camera of the customary type. The camera body 1 supports on its front surface the objective lens 2 and by way of example the between-the lens shutter 3 with time setting ring 8. The construction of the camera is of the ordinary type. Thus it provides on its top the release button 4, a knob 5 for advancing the film and winding the shutter, a knob 6 for rewinding the exposed film and a range-finder 7.

In order to permit focussing the lens provides a focussing ring 62 which may be rotated with respect to the stationary part 56. This focussing ring provides an internal thread which cooperates with the corresponding thread of the lens mount 84. Thus by rotating the focussing ring 62 the entire lens or parts thereof may be displaced in direction of the optical axis and the camera thus focussed. The entire mount thus provides stationary parts, rotating parts and axially displacing parts. In order to eliminate backlash, particularly axial backlash, between the rotatable and the stationary parts and thus ensure an easy setting movement without excessive friction, the stationary parts and the rotating parts are urged together by means of resilient members, so that any backlash between these parts is eliminated. The details of this construction will be explained with reference to Fig. 2.

Fig. 2 explains the details of the inventive construction with respect to an interchangeable objective lens, but it is obvious that it is valid likewise with objective lenses which are fixedly mounted to the camera body.

In order to fixe interchangeably the objective lens to the camera a bayonet ring 10 is provided which is fixed to the front wall 14 of the camera by screws 12. At the rear of ring 10 the shutter 3 is fixed which is operated, i.e. wound and released from the camera, e.g. by means of a shaft 9. Bayonet protrusions 54 of the lens mount cooperate with the bayonet slots 20 of this bayonet ring 10. This lens mount 52 is fixedly connected by several screws 58 to part 56 mentioned above. The flange 60 of the grip ring 56 serves as a guide for a Z-shaped rotatable focussing ring 62. At the rear of flange 60 several cantilever springs 66 are fixed by screws 64 along the circumference. Each of these cantilever springs reaches into a slot 68 in the circumference of the setting ring 62 and urges setting ring 62 in direction to the camera (i.e. downward in Fig. 2). Thus the rotatable ring 62 is urged towards the fixed ring 56, so that no clearance exists between those parts and still ring 62 may be easily rotated within ring 56.

Setting ring 62 is connected to a threaded tube 70. This threaded tube is supported on a flange 74 of ring 62 and is fixed by a holding down ring 80 by means of several screws 82. Thus a tube 70 and ring 62 form a unit which may be rotated together. However, it is possible during the assembly process to rotate tube 70 with respect to ring 62. This has the purpose of adjusting the focussing scale 214 located on the circumference of ring 62 with respect to the thread of tube 70 which serves for axially displacing the objective lens as will be explained below. The threaded tube 84 meshes with an internal thread of tube 70 and carries at the same time a second tube 88 by means of screws 86. Parts 84 and 88 are secured against rotation by means well known but not shown in the drawing, as this has been shown e.g. in my copending U.S. patent application Serial No. 558,375, filed January 10, 1956, now abandoned. Thus a rotation of ring 62 which at the same time rotates tube 70 internally threaded will cause parts 88 and 84 to move in an axial direction, whereby the camera objective lens is focussed. Tubes 84 and 88 support the lenses 96, 98 and 102 which form the entire objective lens 2 and which are supported by their particular mounts 94 and 100. This arrangement thus shows an objective lens which may be axially displaced as a whole for focussing. It is, however, obvious that a part of the lens only may be axially displaced for this purpose, as is well known.

Located in the space 104 between the lenses 98 and 102 is an iris diaphragm of well known construction. Operation of the diaphragm sectors 106 is effected by a pot-shaped diaphragm setting ring 114, which is rotatably supported between parts 84 and 88. An arm 118 of ring 114 passes through an arcuate slot 120 and meshes with slot 122 of an arm 124 which is fixed to the operating ring 126. This operating ring 126 is urged against a ring 136 which is rotatably supported on a shoulder 128 of setting ring 62. Ring 136 is urged against this shoulder by tongues 134 of several springs 132 engaging the ring 126 and thus axially fixed. Thus ring 126 is supported and any axial clearance between ring 62 and ring 126 is eliminated by the pressure of spring 134. The pressure of springs 132, 134 is chosen so that the resilient friction between parts 126, 128 and 136 permits easy rotation of these parts.

Operating ring 126 provides a second arm 138 reaching in outward direction. It passes through a circumferential slot 140 of ring 56 and meshes with a slot 142 of the exterior diaphragm setting ring 144. Thus rotation of ring 144 actuates eventually diaphragm setting ring 114 and thus operates the diaphragm. Diaphragm setting ring may be coupled to shutter speed setting ring 8, as this has been shown e.g. in my copending U.S. patent application Serial No. 507,703, filed May 11, 1955 (now Patent 2,887,940, granted May 26, 1959).

The objective furthermore comprises an arrangement for indicating depth of field which is located within the free space left between parts 56, 62 and 126. As such arrangements for indicating depth of focus have been shown in the U.S. patent application, Serial No. 555,964, filed Dec. 28, 1955, and U.S. patent application, Serial No. 557,183, filed Jan. 3, 1956, they will not be described in detail in the present specification. Two pointers 210 and 212 reach through an arcuate slot 213 of gripping ring 56 and thus cooperate in a well known manner with the focussing scale 214 on the circumference of ring 62. Pointers 210 and 212 are fixed to two coaxial rings 216, 218 rotationally supported on tube of ring 62 and held in a certain axial distance by ring 220. Rings 216, 218 are operated by operating ring 126 in a manner represented in the above indicated application.

Parts 216, 218, 220 of the depth of field indicating apparatus are located in between ring 136 and a shoulder 222 of setting ring 62, so that the cantilever springs 132 which serve to eliminate the axial clearance between parts 126 and 128 at the same time safeguard the parts of the depth of field indicating arrangement. As may be seen from Fig. 2 the cantilever springs 66 and 132 require only very little space, so that they may be easily accommodated in this free space left between the different parts of the lens mount.

As has been explained resilient means, e.g. cantilever springs, are provided between the fixed parts, e.g. ring 56 and the rotating parts, e.g. ring 62 of the lens mount which urge together stationary parts and rotating parts and thus eliminate all axial clearance between these parts.

This permits the achievement of certain advantages. The individual parts of the lens mount may be manufactured and machined with larger tolerances without decreasing the accuracy of the lens mount as a whole, as the greater clearance caused by the larger tolerances is eliminated by the resilient mounting of the parts. Furthermore the spring force of the resilient means may be exactly adjusted, so that the friction between rotating parts and stationary parts is neither too small nor too great, so that an easy rotational operation is achieved. The invention thus permits the economical manufacture of the lens mount without decreasing the optical quality. It is obvious that the present invention is not restricted to the shown embodiment and it is obvious that the employment of resilient means between stationary parts and displaceable parts may be used, wherever it proves necessary to eliminate clearances which are caused by larger tolerances of the manufacturing process.

If the camera is provided with a coupling of the lens focussing with a range-finder, the Z-shaped cam ring 154 is employed. This ring provides a shoulder 156 which is supported by the corresponding flange on the fixed part 52, 56. This ring is again urged against its support by the action of tongues 134a of the above mentioned cantilever springs 132, so that clearances between ring 154 and its support are eliminated but that ring 154 may easily rotate. Ring 154 provides a curved cam surface 162 which cooperates with a pin 164 which is axially displaced when ring 154 is rotated, and thus operates in a well known manner the range-finder on the camera.

In the case shown in Fig. 2 the pin 164 passes through the shutter mechanism contained in housing 7 as has been shown in the U.S. patent application, Serial No. 419,286, filed Mar. 29, 1954. In order to rotate ring 154 together with the focussing ring 62, ring 154 provides an arm 158 which meshes with a slot 160 in the tubular part of ring 62. This coupling between ring 154 and ring 62 permits no relative rotational movement between both parts. It permits, however, axial or other displacement which may be caused by misalignment of ring 62 and ring 154, such as e.g. axial displacement of both parts. Thus the coupling provided by arm 158 and slot 160 permits transmission of the rotational movement without any backlash, permits however, an axial displacement of both parts which does not effect the transmission of rotational movement. This construction thus permits the manufacture of the parts supporting ring 62 with greater tolerance as their axial displacement will not influence the axial position of ring 154 which latter has a bearing upon the accuracy of the range-finder setting, as ring 154 is always urged against shoulder 157 of the fixed part 52. Thereby the exact position of the focussing cam and exact operation of the range-finder is safe-guarded at the same time permitting the employment of larger tolerances for the manufacture of the setting ring.

What I claim is:

1. A photographic camera and range finder structure including a focusing lens mount having an optical axis, said lens mount also having a body portion normally stationary both rotationally and axially during focusing, a focus adjusting ring mounted on said body portion for rotation thereon without axial movement, a lens carrier mounted for axial movement on said body portion without rotation and operatively coupled to said focus adjusting ring to be moved axially by rotation of said ring, a range finder control cam mounted on said body portion for rotation concentric with said optical axis, and means for rotating said cam in conjunction with rotation of said focus adjusting ring, characterized by a first seating surface on said body portion against which said focus adjusting ring is rotatably mounted, first spring means resiliently urging said adjusting ring axially in a direction to keep it seated against said first seating surface, a second seating surface on said body portion against which said range finder control cam is rotatably mounted, and second spring means resiliently urging said range finder control cam axially in a direction to keep it seated against said second seating surface.

2. A construction as defined in claim 1, in which both of said spring means comprise cantilever leaf springs anchored on said body portion and having cantilever ends resiliently engaging said adjusting ring and said range finder control cam, respectively.

3. A construction as defined in claim 1, in which said range finder control cam and said focus adjusting ring are mounted coaxially for rotation concentrically with each other on said separate seating surfaces, further characterized by the fact that said means for rotating said cam comprises means rotationally coupling said range finder control cam to said focus adjusting ring in a manner permitting axial displacement between said cam and said ring.

4. A construction as defined in claim 3, in which said coupling means includes a tongue on one of the coupled members and an axially extending slot in the other of the coupled members for receiving said tongue in a non-rotatable but axially slidable manner.

References Cited in the file of this patent

UNITED STATES PATENTS

| | | |
|---|---|---|
| 1,661,279 | Wandersleb | Mar. 6, 1928 |
| 1,676,595 | Wittel | July 10, 1928 |
| 1,848,402 | Wollensak | Mar. 8, 1932 |
| 1,923,376 | Howell | Aug. 22, 1932 |
| 2,026,724 | Wollensak | Jan. 26, 1936 |
| 2,053,231 | Taylor | Sept. 1, 1936 |
| 2,124,161 | Cook et al. | July 19, 1938 |
| 2,138,059 | Becker | Nov. 29, 1938 |

FOREIGN PATENTS

| | | |
|---|---|---|
| 676,075 | Great Britain | July 23, 1952 |